United States Patent [19]

Pierpont

[11] 4,068,291

[45] Jan. 10, 1978

[54] SOLID ELECTROLYTE CAPACITOR WITH IMPROVED CATHODE LEAD

[75] Inventor: Ralph Erskine Pierpont, Kennebunk, Maine

[73] Assignee: Sprague Electric Company, North Adams, Mass.

[21] Appl. No.: 675,833

[22] Filed: Apr. 12, 1976

[51] Int. Cl.$^2$ .............................................. H01G 9/00
[52] U.S. Cl. ...................................... 361/433; 338/332
[58] Field of Search ................ 317/230; 338/272, 332; 339/275 A, 278 A; 361/433, 310; 29/628

[56] References Cited

U.S. PATENT DOCUMENTS

| | | | |
|---|---|---|---|
| 2,019,457 | 10/1935 | Lodge | 339/275 A |
| 3,121,279 | 2/1964 | Van Hoof et al. | 29/627 |
| 3,189,797 | 6/1965 | Okamoto et al. | 317/230 |
| 3,573,566 | 4/1971 | Fournier et al. | 317/230 |
| 3,588,628 | 6/1971 | Peck | 317/230 |
| 3,646,404 | 2/1972 | Matsuo et al. | 317/230 |
| 3,970,903 | 7/1976 | Shirn | 317/230 |

FOREIGN PATENT DOCUMENTS

| | | | |
|---|---|---|---|
| 2,357,525 | 5/1974 | Germany | 361/433 |
| 2,318,051 | 4/1973 | Germany | 338/332 |
| 2,402,122 | 7/1974 | Germany | 317/230 |

Primary Examiner—Stanley D. Miller, Jr.
Assistant Examiner—James W. Davie
Attorney, Agent, or Firm—Connolly and Hutz

[57] ABSTRACT

A standard solid electrolyte capacitor body having an outer surface of graphite and an anode lead has a novel cathode lead structure. A "c" shaped thin strip portion of the cathode lead is formed about the body and has a solder connection made therebetween. A wire-lead portion of the cathode lead extends away from the body in a parallel direction to that of the anode lead. The cup or "c" shaped portion of the cathode lead makes possible the easy registration of lead to body prior to soldering, even when tiny bodies are employed, which is especially effective during the large batch manufacturing steps in the mass production of capacitors.

6 Claims, 8 Drawing Figures

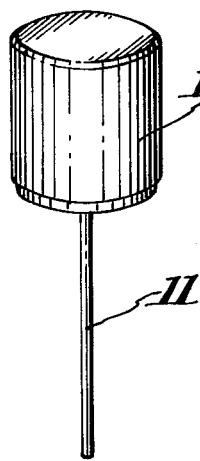
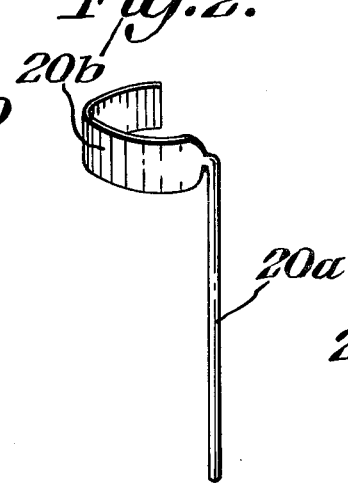
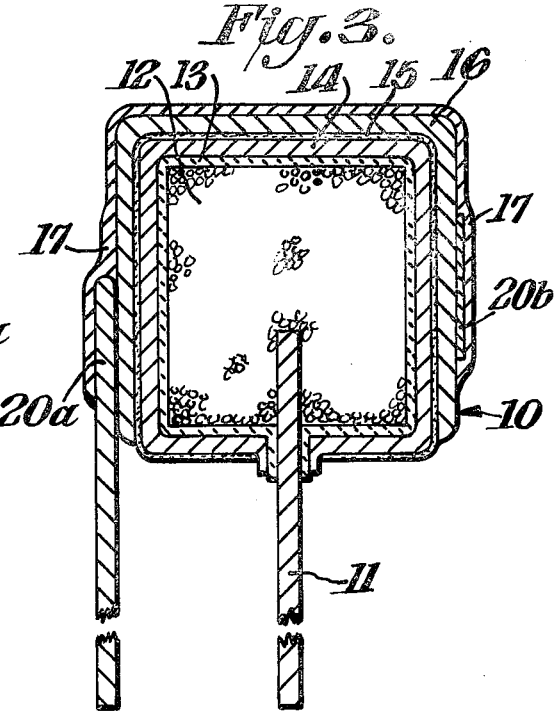
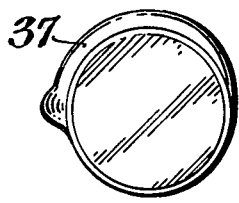
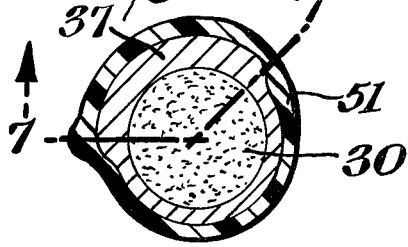
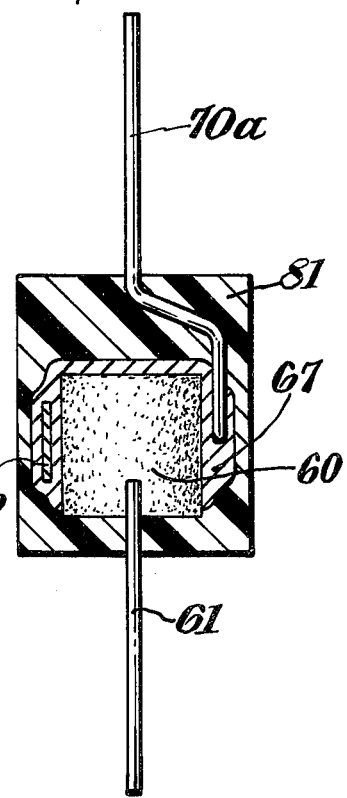
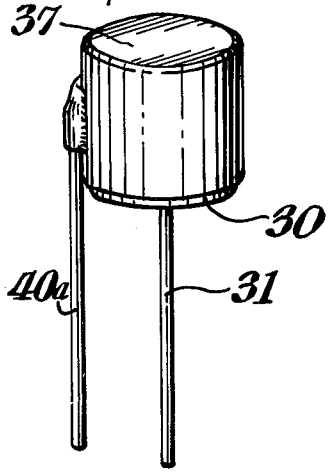
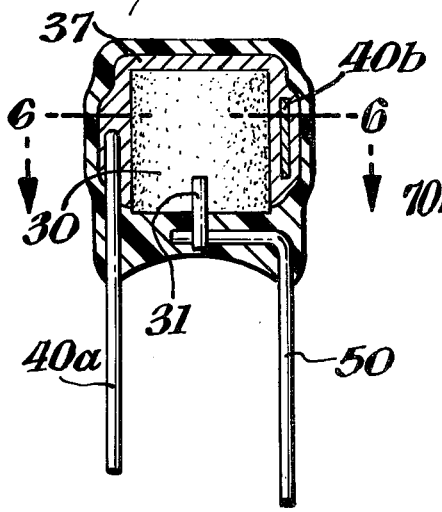

SOLID ELECTROLYTE CAPACITOR WITH IMPROVED CATHODE LEAD

BACKGROUND OF THE INVENTION

This invention relates to a solid electrolytic capacitor and more particularly to an improved cathode especially for a small solid electrolytic capacitor body. Numerous means are known for forming a cathode electrode and attaching a cathode lead wire thereto. The typical solid electrolytic capacitor has a porous valve-metal anode pellet, usually cylindrical, with one anode lead attached; a dielectric film is formed over the surfaces of the pellet and this is covered by a solid electrolyte; next a layer of graphite is applied; then the graphite layer is metallized and a cathode lead wire is attached to the metallized layer.

One known method for attaching the cathode lead wire is to butt solder it, another consists in placing an end of the cylindrical wire flush with the surface of the metallized surface and applying solder, and yet another method employs a lead wire that is spirally wrapped around the graphite coated body and is attached thereto by an overcoat of solder.

Of the first two methods for attaching the cathode lead wire to a small pellet (e.g. a pellet having a diameter less than about five times that of the cathode lead wire to be attached), the solder connection tends to crack and the solder joint between lead and pellet consequently exhibits a high resistance during subsequent handling such as in treating, testing, and/or encapsulating. This typically shows up as a high dissipation factor or open circuit and usually is cause for rejecting the part. The last mentioned means for connecting a cathode lead wire to a pellet is less prone to crack, however all three methods of cathode lead attachment are difficult to implement especially when employing a small pellet since accurate registration of the wire and the pellet prior to soldering cannot be accomplished reliably and surely on a ganged or multiple capacitor basis as in a high speed large scale manufacturing operation. The first two mentioned cathode lead structures are therefore produced with less than desirable final yields and the yield diminishes as the size of the pellet becomes smaller. The latter mentioned method of spiralling the wire about the body can only be accomplished one at a time and tends to produce a capacitor of large diameter.

It is therefore an object of the present invention to provide a solid electrolytic capacitor having a strong low resistance connection between the capacitor body and the cathode lead wire.

It is a further object of this invention to provide a solid electrolyte capacitor capable of being produced with high yields.

It is yet a further object of this invention to provide an electrolytic capacitor employing a small anode and including a reliable cathode structure that contributes minimally to the diameter or bulk of the finished capacitor package.

SUMMARY OF THE INVENTION

A solid electrolytic capacitor includes a cylindrical valve-metal anode having an anode lead extending therefrom, a dielectric film formed over surfaces of the anode, a solid electrolyte over the film, and a layer of carbon particles disposed over the solid electrolyte, the improvement comprising a metal cathode lead having a tin strip portion formed in the shape of a "c" and a wire portion being joined at an end of the strip portion. The "c" shaped strip portion, having the likeness of a cupped hand is positioned about the cylindrical anode so that the anode is nested therein. The carbon particles may have a layer of a conductive solderable material disposed thereover to which the cathode lead strip portion is mounted. A conformal layer of solder lies over the strip and the adjacent regions of the solderable layer, the latter serving to attach and connect the solder and thus the cathode lead to the graphite. An encapsulant may surround the solder covered anode and a near part of the anode and cathode lead wires, providing extra strength to these leads.

The cathode lead strip portion extends about the cylindrical anode from 135° of arc to 180° of arc but preferably about 160° of arc. The cathode lead wire portion extends in a direction that is parallel to that of the extending anode wire. Thus the capacitor may have both leads extending in the same direction forming a "radial leaded" package, or the two leads may extend in opposite directions forming an axial leaded capacitor package.

BRIEF DESCRIPTION OF THE DRAWING

FIG. 1 shows a solid electrolyte capacitor body with an anode lead wire.

FIG. 2 shows a cathode lead of this invention.

FIG. 3 shows a cross-sectional side view of the assembled body and cathode lead of FIGS. 1 and 2, respectively.

FIG. 4 shows in top view an assembled anode body and cathode lead of this invention.

FIG. 5 shows in side view the assembly of FIG. 4.

FIG. 6 shows, in cross-sectional top view taken in plane 6—6, the assembled and encapsulated anode body and cathode lead of FIGS. 4 and 5.

FIG. 7 shows in cross-sectional side view the encapsulated assembly of FIG. 6 taken in the biplane 7—7, providing a so-called "radial leaded" package. The plane 6—6 is defined in this figure.

FIG. 8 shows in cross-sectional side view taken in a biplane an encapsulated axial leaded solid electrolytic capacitor of this invention.

DESCRIPTION OF THE PREFERRED EMBODIMENTS

A conventional solid electrolyte capacitor body 10 having an anode lead wire 11 is shown in FIG. 1. In FIG. 2 there is shown a novel metal cathode lead having a round wire portion 20a and a "c" shaped strip portion 20b. This lead is not necessarily round but may be any other convenient shape such as oval or rectangular. The strip portion 20b is conveniently made by flattening and shaping an end portion of the wire 20a by means of a standard cold forming process. The wire 20a is preferably made of nickel having an outer surface of tin or tin-lead solder. This lead however may be made of metals other than nickel, such as copper or steel.

An assembly of the body and novel cathode lead is shown in cross-section in FIG. 3. The body 10 is comprised of a porous valve-metal pellet 12, having a valve-metal-oxide film illustrated as 13 being formed over all the surfaces of the porous pellet. The valve-metal is preferably tantalum. A solid electrolyte 14 overlies the formed pellet and is in intimate contact with the dielectric film 13. The solid electrolyte is preferably manganese dioxide. Overlying the solid electrolyte is a carbon layer 15, more particularly a layer of graphite particles, as is conventional in the art. Next, a metal-containing solderable coating 16 is applied over the graphite. This coating is preferably made by applying in a conventional manner a silver bearing paste over the graphite by dipping and heating the paste to drive of the volatile binder materials therein and/or to cure the organic polymer constituents of the baste biner system.

The body 10 is now prepared for having the cathode lead attached thereto. It is well-known in the large scale manufacture of solid electrolytic capacitors to execute each of the above noted steps simultaneously for a multiplicity of capacitor bodies. This is typically accomplished by attaching a plurality of equally spaced pellets by their anode lead wires to a metal bar. A typical conventional practice is to then prepare a set of tinned copper or nickel lead wires sandwiched between a cardboard strip and an adhesive tape. The parallel wires extend away from the cardboard strip and are arranged in pairs, each pair being spaced from the adjacent pairs by a distance corresponding to the spacing of the capacitor pellets on the metal bar. The pellets are then clamped into a fixture and the anode wires are severed from the bar, the spacing of the pellets being retained by the clamping fixture. The card of lead wires is registered with the pellets in the clamp so that a short wire in each wire pair lies adjacent to an anode wire of a pellet, and a weld is made to join the short wire and anode wire. A long wire of each pair should now be registered adjacent to the cathode coating of each pellet and a dip soldering step joins the long wire and the cathode coating of the pellets.

It is this cathode lead registration step that as has been mentioned above is difficult to achieve reliably, particularly when employing small pellets. To accurately register each of a number of cathode lead wires with a corresponding body requires great accuracy in the original spacing, great care to avoid inadvertent distortion of the spaced parts and a delicate adjustment in registering the carded cathode leads with a group of anode pellets. Inevitably, when using conventional leads, some of the cathode leads are misregistered with their corresponding pellet.

According to the principles of the present invention the "c" shaped portion 20b of the cathode lead forms a nest that is self-registering with a body to avoid the aforementioned difficulties. The radius of curvature of the "c" shaped strip portion 20b is essentially the same as the diameter of the coated body 10. After the body 10 is nested in the strip 20b with the cathode wire 20a extending from the body in a direction parallel to that of the anode lead, the assembly is dip soldered and the solder overcoat 17 is fused with the tinned srip 20b and the solderable layer 16 providing a structurally strong cathode lead structure. Now, even if the cathode lead wire is inadvertently bent during subsequent process steps and handling, some cracking of the solder 17 in the vicinity of the wire portion 20a is tolerable since a sound electrical connection to the body remains secure along the strip portion 20b.

The solderable layer 16 may be omitted and the solder layer 17 applied directly over the strip 20b and the graphite layer 15, although the use of the layer 16 is preferred for providing a stronger and more reliable connection.

It will now be appreciated that the novel cathode lead of this invention is particularly useful in a large scale manufacturing process wherein large groups of cathode leads are simultaneously, accurately and reliably registered with a correspondingly large member of solid electrolyte capacitor bodies prior to soldering the cathode leads to the bodies.

For the purposes of this invention and with reference to FIGS. 4, 5, 6 and 7, the cathode strip portion 40b should extend about the body 30 no further than 180° of arc so that it is not necessary to distort the strip to nest the body therein, and no less than 135° of arc to provide an effective nest. It is preferable that the "c" shaped strip extend less than 180°, namely about 160°, so that the overall diameter at its greatest dimension of the assembly as measured over the solder overcoat 37 is kept to a minimum.

Thus, a lead wire that is merely flattened at one end and even further dished or made in the shape of a spade to conform to the capacitor body will not provide the degree of self registration with the body that is achieved by the cathode lead illustrated in FIG. 2 which can extend at least 135° about the body.

In FIGS. 6 and 7 there is shown the capacitor of FIGS. 4 and 5 of this invention wherein the valve-metal anode wire 31 is cut short and a tinned nickel wire 50 is welded thereto so that both externally extended anode and cathode lead ends 40a and 50 may have the same physical properties and are solderable. At this point the assembly may be encapsulated, for example, by dipping in an epoxy or other suitable liquid resin and curing to provide a hard insulative coating for protection of the body against physical damage and atmospheric contaminants. The resin encapsulant also provides additional strength to both leads 40a and 50.

The capacitor of FIG. 8 is an axial leaded package employing a similar asymmetrical cathode lead to that in FIG. 2. The porous valve-metal anode pellet 60 has a film of dielectric oxide thereover and a solid electrolyte disposed over the dielectric film. A graphite layer is deposited onto the surface of the solid electrolyte. These later three elements are not shown in this figure. The cathode system is comprised of a cathode lead 70 and a metal layer 67 making a physical and electrical connection between the cathode lead strip portion 70b and the graphite surface of the capacitor body. The cathode system may be composed, as in FIG. 3, of a silver bearing layer and a solder layer. The cathode lead wire 70a still extends from the body 60 in a direction parallel to the anode lead, as in the "radial leaded" assemblies of FIGS. 3 through 7. Although a conformal encapsulant similar to that of FIG. 7 may be applied over the body of FIG. 8, it is easier and thus preferable to encapsulate this axial leaded part by transfer or injection molding.

What is claimed is:

1. A solid electrolytic capacitor including a cylindrical valve-metal anode with an attached anode lead wire extending from a flat end face thereof, a dielectric oxide film being on the surface of said anode, a solid electrolyte disposed over said dielectric oxide film and a layer of graphite overlying said solid electrolyte wherein the improvement comprises a unitary metal cathode lead capable of being made by a cold forming process having a thin flattened strip portion formed in the shape of a "c" and having a wire portion being joined at an end of said "c" shaped strip portion, said "c" shaped strip portion being positioned concentrically and extending about 160 and less than 180° of arc about said cylindrical anode, and a conformal layer of solder being formed over and soldered to said strip portion and having a connection to said graphite layer, said cathode wire lead portion extending away from said anode in a direction that is essentially parallel to that of said extending anode lead wire.

2. The capacitor of claim 1 wherein a conductive solderable coating overlies and adheres to said graphite layer, and said strip lead portion conforms to and lies in contact with said solderable coating, said solderable coating serving as said connection between said layer of solder and said graphite.

3. The capacitor of claim 2 wherein said solderable coating contains silver particles.

4. The capacitor of claim 1 additionally comprising an insulative encapsulant covering said layer of solder and a part of said anode and of said cathode leads.

5. The capacitor of claim 1 wherein said cathode wire lead portion extends in the same direction away from said anode relative to said direction of said anode lead.

6. The capacitor of claim 1 wherein said cathode wire lead portion extends in the opposite direction away from said anode relative to said direction of said anode lead.

* * * * *